United States Patent
Khaled et al.

(12)

(10) Patent No.: US 11,039,227 B2
(45) Date of Patent: Jun. 15, 2021

(54) PACKET SERVICING FOR ENHANCED CAPABILITY IN TIME-SLOTTED SYSTEMS

(71) Applicant: Itron Global SARL, Liberty Lake, WA (US)

(72) Inventors: Yacine Khaled, Meudon (FR); Khalid Maallem, Issy les Moulineaux (FR); Jerome Bartier, Edinburgh (GB)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 16/669,989

(22) Filed: Oct. 31, 2019

(65) Prior Publication Data

US 2021/0136469 A1    May 6, 2021

(51) Int. Cl.
| | | |
|---|---|---|
| *H04Q 9/00* | (2006.01) | |
| *H04L 12/863* | (2013.01) | |
| *H04L 12/861* | (2013.01) | |
| *H04W 84/18* | (2009.01) | |
| *H04W 80/02* | (2009.01) | |

(52) U.S. Cl.
CPC .............. *H04Q 9/00* (2013.01); *H04L 47/625* (2013.01); *H04L 47/627* (2013.01); *H04L 49/9036* (2013.01); *H04Q 2209/826* (2013.01); *H04Q 2209/88* (2013.01); *H04W 80/02* (2013.01); *H04W 84/18* (2013.01)

(58) Field of Classification Search
CPC .. H04Q 9/00; H04Q 2209/00; H04Q 2209/20; H04Q 2209/25; H04Q 2209/40; H04Q 2209/60; H04Q 2209/80; H04Q 2209/826; H04Q 2209/88; H04Q 2209/883; H04L 47/625; H04L 47/627; H04L 49/9036; H04W 80/02; H04W 84/18
See application file for complete search history.

(56) References Cited

U.S. PATENT DOCUMENTS

| | | | |
|---|---|---|---|
| 6,205,150 B1* | 3/2001 | Ruszczyk | .............. H04L 47/564 370/412 |
| 2018/0191478 A1* | 7/2018 | Uhling | .................. H04L 5/0055 |
| 2019/0089558 A1* | 3/2019 | Hirose | .............. H04L 12/40091 |

* cited by examiner

*Primary Examiner* — Franklin D Balseca
(74) *Attorney, Agent, or Firm* — Lee & Hayes, P.C.

(57) ABSTRACT

Disclosed are techniques to provide data at listening event offsets, using a buffering scheme having a common buffer. Received data, to be transmitted at the listening event offsets, is stored into the common buffer without classification to listening event offsets. Data to be transmitted at an upcoming listening event offset is identified in the common buffer prior to the listening event offset. Example techniques provide for simpler reconfigurability of listening events offsets, as well as transmitting data at each listening event offset that is responsive to a state of the system prior to the listening event offset.

20 Claims, 10 Drawing Sheets

PACKET SERVICING FOR ENHANCED CAPABILITY IN TIME-SLOTTED SYSTEMS

BACKGROUND

Utility meters such as electric, water and gas meters have evolved from isolated devices that simply measure utility consumption and display a consumption reading to so called "smart meters" that are connected devices capable of reporting resource consumption readings automatically over a utility communication network. Some meters, such as electric meters, are powered by electricity service ("mains power") from the electricity grid. Other devices, such as many water and gas meters, are battery powered. In many cases, such battery powered devices are expected to operate for extended periods of time (e.g., twenty years or more) without the batteries being recharged or replaced.

The capabilities of smart meters are continuously growing. Many of the added capabilities of smart meters come with increased power demands on the meter. However, battery technologies have not kept pace with the increased power demands. For this reason, battery powered smart meters have not always been able to adopt many of the new capabilities that have been possible for mains powered devices because doing so would shorten their battery life. Consequently, battery powered smart meters have generally had more limited functionality than their mains powered counterparts, and they have been unable to join certain types of communication networks. Other battery powered devices have faced similar challenges of increasing functionality and communication ability without sacrificing battery life.

Furthermore, even when battery powered devices have adapted to operate in a more power-efficient manner, devices that communicate with the battery powered devices (including but not limited to mains powered devices) have not always been able to adapt to meet the communication requirements of the battery powered devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
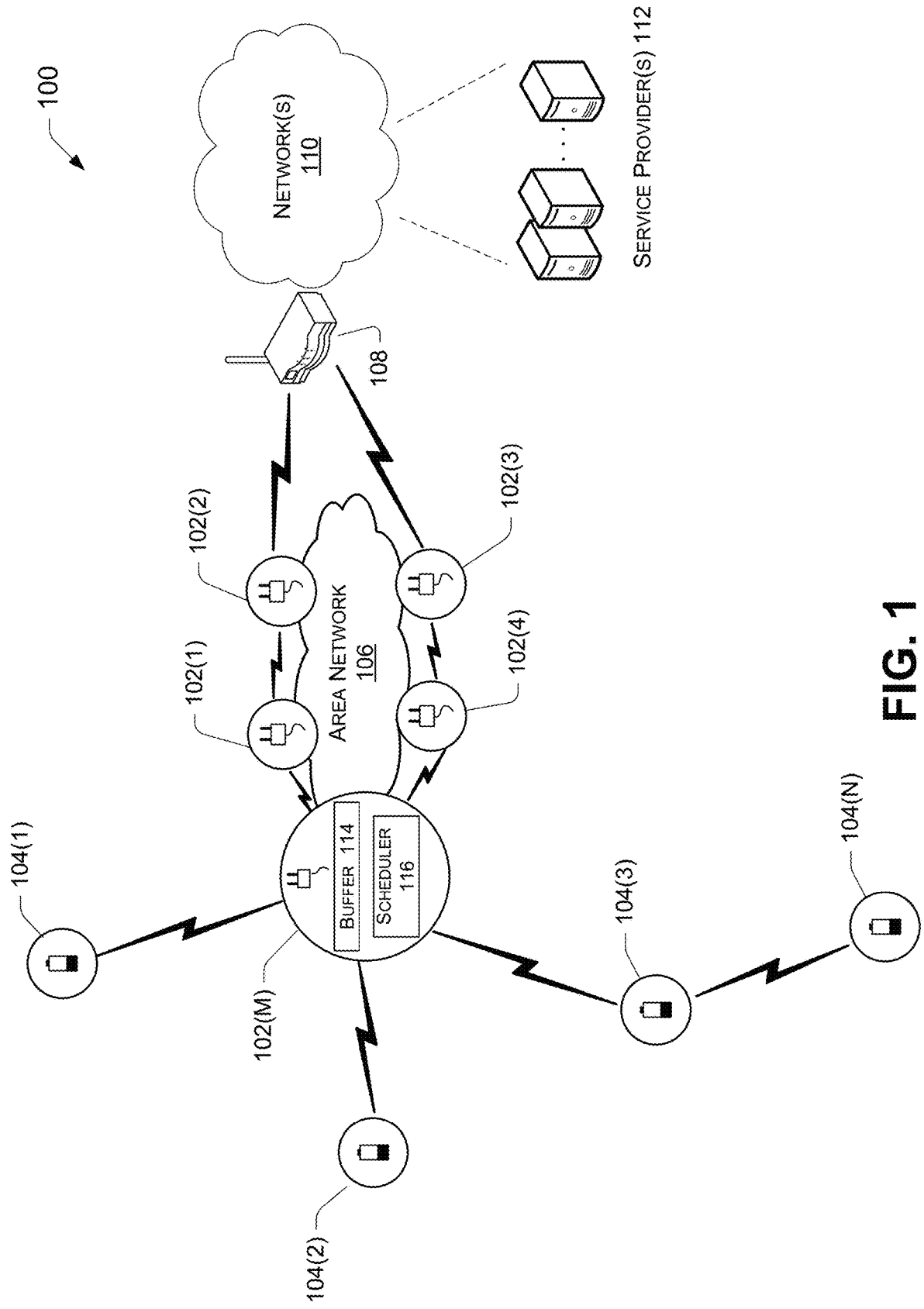
FIG. 1 is a schematic diagram of an example network architecture.

A wireless network of devices may include one or more MPDs and one or more BPDs. The MPDs are connected to an electrical power grid, and their radio usage and processing abilities are not limited by the availability of electricity, whereas the BPDs are constrained to the electricity provided by their batteries.

In one example, each BPD has a "parent" device that is a MPD. In the example, each MPD may be associated with one or more "child" BPDs, and may assign "event offsets" to each of its child BPD node(s). The event offsets are a time by which the BPD's time slot is "offset" from the start of a periodic cycle of transmissions. Thus, each event offset indicates a time that the BPD is scheduled to be "awake," i.e., operating its radio receiver and/or performing other functionality. Another BPD may have a different event offset. Accordingly, communications by the MPD with each child BPD are spread over the period of time. Techniques are described in which BPD scheduling operations in a transmitting device, such as an MPD, can be more easily dynamical reconfigured to handle data of added listening event offsets.

Example events may include at least a time at which the BPD is able to receive information, e.g., data and/or a command, etc., and perhaps send information over the wireless network. The time of the event may include a start time, and possibly an end time and/or of the event. The event may include transfer of information from the BPD to the MPD, or the reverse, etc. In a further example, a MPD assigns event offsets to each BPD in a manner that minimizes overlap in time, and provides a start-time and/or time-period for one- or two-way unicast transmission to each BPD. In some examples, two or more BPDs may be associated with a multicast and/or broadcast event timed according to one or more event offsets. The use of event offsets reduces an amount of time during which the BPDs need to be "awake" to receive radio signals, and this allows the BPDs to turn on a radio in a just-in-time manner.

In an example, event offsets that are used during the period of time to manage timing of transmission of messages to devices on a network are spread substantially uniformly among the plurality of event offsets. Thus, some event offsets may be used by the MPD for communication with BPDs. However, other event offsets may not be used (e.g., if there are more event offsets than BPDs associated with a MPD). In such a situation, the event offsets to be used may be selected to time communications between devices in a manner that distributes the communications over the period of time.

In examples, MPDs and BPDs may be deployed in different network types. Such network types may include mesh networks, star networks, and/or hybrid networks having mesh and star characteristics and/or portions. An event may include a broadcast event to a plurality of BPDs. An event may include a multicast to a plurality or group of BPDs. An event may include a unicast transmission to, or series of messages between, MPD(s) and/or BPD(s). In an example, the BPDs are utility meters, such as gas or water meters. The MPD(s) may be relay devices, electric metering devices, dedicated communications devices, etc. In a more specific example, the MPD(s) may be electricity meters, which relay data from BPDs that may be water meters, gas meters, or other devices.

Each MPD may transmit and receive information in a periodic manner. In an example, the MPD may perform one- or two-way communications and/or other events with a series of BPDs. The communications and/or events may be performed in a sequence over a period of time. Within the period, a plurality of BPDs each have their event offset from the start of the period, within which they communicate with the MPD. The event offsets are, for example, defined by a schedule that is known by the MPD and the BPDs. During additional and subsequent periods of time, the communications and/or events may be repeated.

Example Environment

FIG. 1 shows an example networked environment or architecture 100. The architecture 100 includes multiple network communication devices. The network communication devices include MPDs 102(1), 102(2), 102(3), 102(4), . . . 102(M) (collectively referred to as "MPDs 102"), and battery powered devices (BPDs) 104(1), 104(2), 104(3), . . . 104(N) (collectively referred to as "BPDs 104"), where M and N are any integers greater than or equal to 1 and may be the same number or different numbers. In some illustrations, the MPDs 102 include more functionality/resources than the BPDs 104. In one example, the MPDs 102 are implemented as mains-powered devices (MPDs) that are connected to mains electricity (e.g., electricity meters), while the BPDs 104 are implemented as battery-powered devices (BPDs) that are not connected to mains electricity (e.g., water meters, gas meters, etc. that employ batteries). However, in other examples, the MPDs 102 and BPDs 104 may have different processing power, processing capabilities, and so on. The techniques discussed herein may be implemented to communicate between MPDs 102, BPDs 104, or any combination of devices.

The network communication devices are in communication with one another via an area network (AN) 106. As used herein, the term "area network" refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, etc.

The term "link" refers to a direct communication path between two devices (without passing through or being relayed by another device). A link may be over a wired or wireless radio frequency (RF) communication path. Each link may represent a plurality of channels over which a device is able to transmit or receive data. Each of the plurality of channels may be defined by a frequency range which is the same or different for each of the plurality of channels. In some instances, the plurality of channels comprises RF channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the area network 106 may comprise a star network, in which a central device acts a parent to one or more children devices. For example, the MPD 102(M) may act as a parent to the BPDs 104(1), 104(2), and 104(3). As shown in the example of MPD 102(M) in FIG. 1, an MPD may include a buffer 114 and scheduler 116, where the buffer 114 is a common buffer to hold data for transmission to downstream BPDs (such as BPDs 104(1), 104(2), and 104(3) in FIG. 1), and the scheduler 116 determines when to provide the data to a portion of the MPD for transmission to the downstream BPDs.

In some instances, the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In many examples, the BPDs 104 are implemented as leaf nodes. A leaf node may generally communicate with a parent node and not relay data for another node. As illustrated in FIG. 1, the BPDs 104(1) and 104(2) act as leaf nodes, with the MPD 102(M) being the parent node. However, in other examples the BPDs 104 may relay data for other nodes. For instance, the BPD 104(3) may relay data for the BPD 104(N). Further, any type of device may be implemented as a leaf node (e.g., any of the MPDs 102).

The communication network 100 may also include an edge device 108, which serves as a connection point of the AN 106 to one or more networks 110 (e.g., a backhaul network), such as the internet. The edge device 108 may include, but is not limited to, a field area router (FAR), a cellular relay, a cellular router, an edge router, a DODAG (Destination Oriented Directed Acyclic Graph) root, a root device or node of the AN, a combination of the foregoing, etc. In this illustrated example, the edge device 108 comprises a FAR, which relays communions from the AN 106 to one or more service providers 112 via the network(s) 110.

In some instances, the one or more service providers 112 comprise one or more central office computing systems that include a security service such as authentication, authorization and accounting (AAA) server, a network registration service such as dynamic host configuration protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the one or more service providers 112 comprise other systems to implement other functionality, such as web services, cloud services, and so on. In yet other instances, the one or more service providers 112 may be implemented as other types of devices, such as in the context of the internet of things (IoT) that allows a variety of devices to exchange data.

The one or more service providers 112 and/or their computing systems may be physically located in a single central location, or they may be distributed at multiple different locations. The one or more service providers 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In many instances, a BPD may connect to a network by connecting directly with one or more MPDs. To illustrate, a battery powered water meter, for example, the BPD 104(1), discovers in its vicinity an electricity meter, the MPD 102(M), connected to mains power. Because the MPD 102(M) is connected to mains power, it has no practical energy constraints. The BPD 104(1) may associate the MPD 102(M) as its parent, in which case the MPD 102(M) acts as the connecting point between the BPD 104(1) and the one or more service providers 112.

In other instances, an BPD can connect to a network via an BPD that acts as a relay (an BPD relay). To illustrate, the BPD 104(N) may be a gas meter, which discovers a battery powered water meter, the BPD 104(3), which is already connected to the AN 106 via the MPD 102(M) and can play the role of an BPD relay. The BPD 104(N) may associate this BPD-relay, the BPD 104(3), as its parent to get connected to the AN 106. In yet further instances, an BPD may connect to other networks and/or connect in other manners.

Example Network Communications Devices

Figure 2:
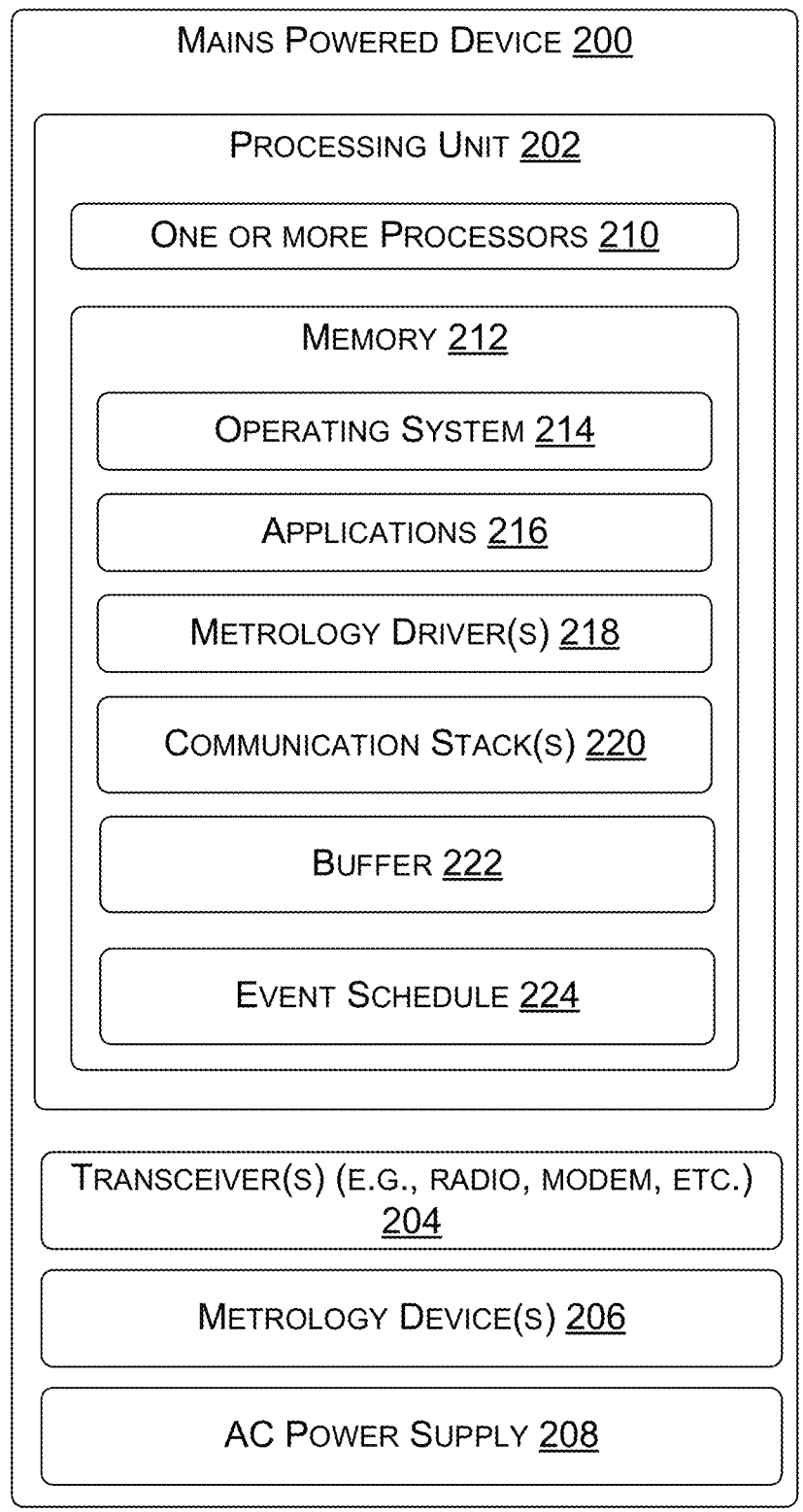
FIG. 2 is a diagram showing details of an example mains-powered device (MPD).

FIG. 2 is a diagram showing details of an example MPD 200. In this example, MPD 200 comprises a device that is connected to mains power, such as an electricity meter, sensor, etc. However, as discussed above, MPDs can take numerous different forms, depending on the industry and context in which they are deployed. Different types of MPDs may have different physical and/or logical components. For instance, utility meter MPDs such as that shown in FIG. 2A may have metrology components, whereas other types of MPDs may not.

As shown in FIG. 2, the example MPD 200 includes a processing unit 202, a transceiver 204 (e.g., radio), one or more metrology devices 206, and an alternating current (AC) driven power supply 208 that couples to the AC mains power line wherein the MPD 200 is installed. The processing unit 202 may include one or more processors 210 and memory 212. When present, the one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may comprise one or more hardware and/or software implemented radios to provide two-way RF communication with other network communication devices in the AN 106 and/or other computing devices via the network 110. The transceiver 204 may additionally or alternatively include a modem to provide power line communication (PLC) communication with other network communication devices that are connected to an electrical service grid.

The metrology device(s) 206 comprise the physical hardware and sensors to measure consumption data of a resource (e.g., electricity, water, or gas) at a site of the meter. In the case of an electric meter, for example, the metrology device(s) 206 may include one or more Hall effect sensors, shunts, etc. In the case of water and gas meters, the metrology device(s) 206 may comprise various flow meters, pressure sensors, etc. The metrology device(s) 206 may report the consumption data to the one or more service providers 112 via the transceiver 204. The consumption data may be formatted and/or packetized in a manner, protocol and/or modulation scheme for transmission.

The memory 212 includes an operating system (OS) 214 and one or more applications 216 that are executable by the one or more processors 210. The memory 212 may also include one or more metrology drivers 218 configured to receive, interpret, and/or otherwise process the metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, and/or another protocol. However, in other examples, other protocols may be used, depending on the networks with which the device is intended to be compatible. The communication stack(s) 220 describe the functionality and rules governing how the MPD 200 interacts with each of the specified types of networks. For instance, the communication stack(s) 220 may cause MPDs and BPDs to operate in ways that minimize the battery consumption of BPDs when they are connected to these types of networks. The memory 212 may also include a buffer 222 used by the MPD 200 to hold data to provide to downstream devices such as BPDs, according to an event schedule 224 known by the BPDs.

In some instances, the MPD 200 may be configured to send and/or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

Figure 3:
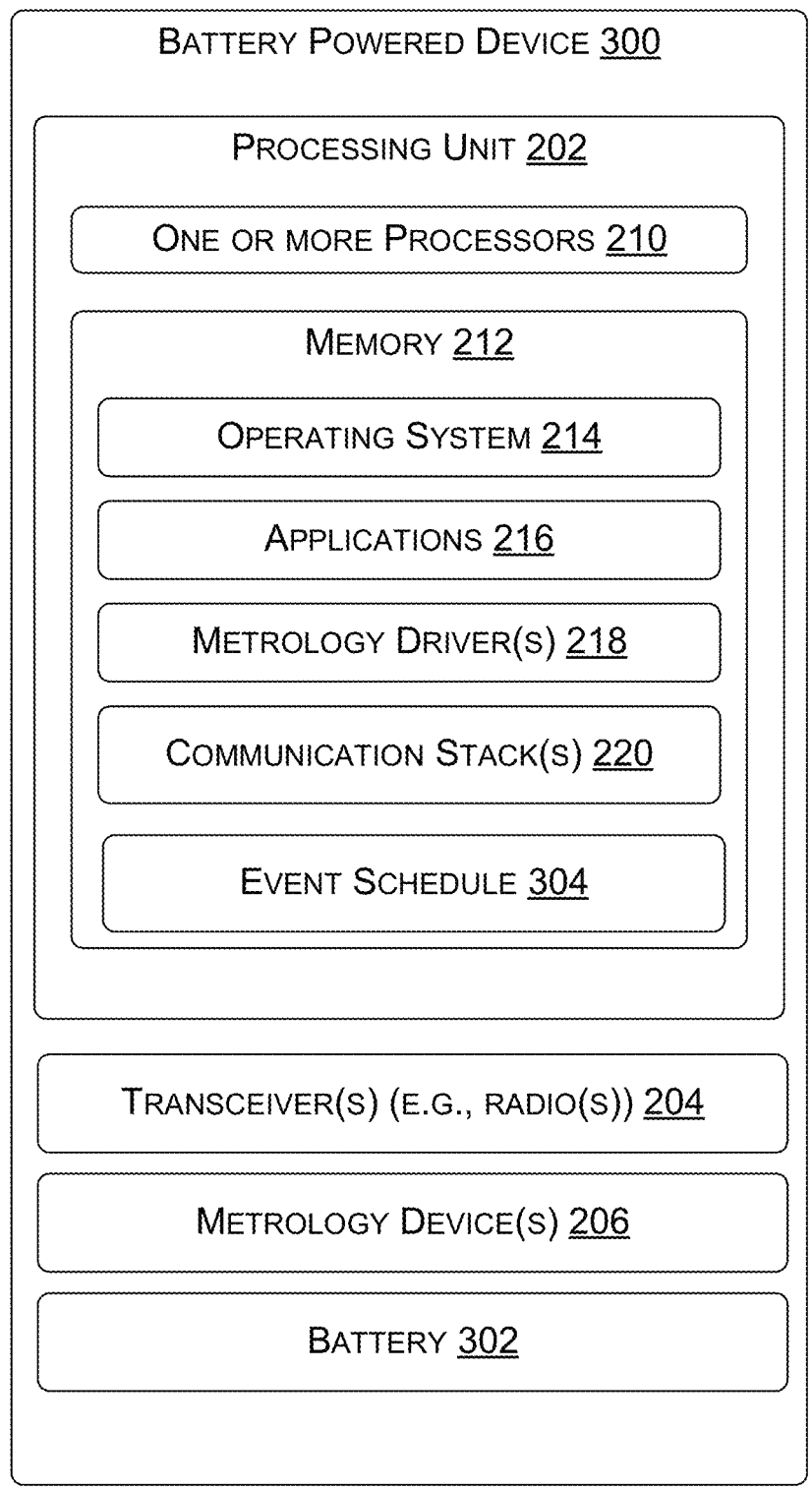
FIG. 3 is a diagram showing details of an example battery powered device (BPD).

FIG. 3 is a diagram showing details of an example BPD 300. In this example, BPD 300 comprises a device that is not connected to mains power. However, as discussed above, BPDs can take numerous different forms, depending on the industry and context in which they are deployed. Different types of BPDs may have different physical and/or logical components. For instance, utility meter BPDs such as that shown in FIG. 3 may have metrology components, whereas other types of BPDs may not.

The BPD 300 of FIG. 3 is similar in many respects to the MPD 200. To the extent that the MPD 200 and BPD 300 include the same or similar components, the functions will not be repeated here. Therefore, the following discussion of the BPD 300 focuses on the differences between the BPD 300 and the MPD 200. However, the differences highlighted below should not be considered to be exhaustive. One difference between the MPD 200 and the BPD 300 is that the BPD 300 may include a battery 302 instead of the AC power supply 208. The specific characteristics of the battery 302 may vary widely depending on the type of BPD. By way of example and not limitation, the battery 302 may comprise a lithium thionyl chloride battery (e.g., a 3-volt battery having an internal impedance rated at 130 Ohms), a lithium manganese battery (e.g., a 3-volt battery having an internal impedance rated at 15 Ohms), a lithium ion battery, a lead-acid battery, an alkaline battery, etc. In addition, the event schedule 304 of the BPD 300 may not be as exhaustive as the schedule 224 of the MPD, as the event schedule 224 would generally include events relative to multiple downstream devices, whereas the event schedule 304 would generally include events only relative to itself.

Also, in some examples, even components with similar functions may be different for MPDS than for BPDs due to the different constraints. As one example, while both MPDs and BPDs have transceivers, the specific transceivers used may be different. For instance, an MPD transceiver may include a PLC modem while an BPD transceiver does not because the BPD is not connected to an electrical power line that could be used for PLC communications. Additionally, or alternatively, an BPD transceiver may employ a lower power RF radio to minimize energy consumption. Further, other components of MPDS and BPDs may vary. In some instances, BPDs are implemented with less functionality and/or include less hardware components than the MPDs. Further, in some instances components of BPDs are lower power components than the corresponding components of the MPDs.

The memory 212 of the MPD 200 and BPD 300 is shown to include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Also, as discussed further below, the functions attributable to the modules may additionally or alternatively be implemented in hardware.

The various memories described herein are examples of computer-readable media. Computer-readable media may take the form of volatile memory, such as random-access memory (RAM) and/or non-volatile memory, such as read-only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EE-PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the MPD 200 and the BPD 300) are described herein, it should be understood that those computing devices may include other components and/or be arranged differently. As noted above, in some instances a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing. Further, in some examples a computing device may be implemented as that described in U.S. application Ser. No. 14/796,762, filed Jun. 10, 2015 and titled "Network Discovery by Battery Powered Devices," the entire contents of which are incorporated herein by reference.

By way of example and not limitation, the MPD 200 and/or the BPD 300 may implement a variety of modulation schemes, techniques, and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

In many instances, information that is included in an information element may be stored in the memory 212 of the MPD 200 and/or the BPD 300. For example, the memory 212 may store any information regarding an operating context, such as schedule data, channel data, seed data, timing data, and so on. In some instances, components of the MPD 200 and/or the BPD 300 may reference the information to determine how to communicate according to a specific operating context.

Example Downlink Event Allocation

Figure 4:
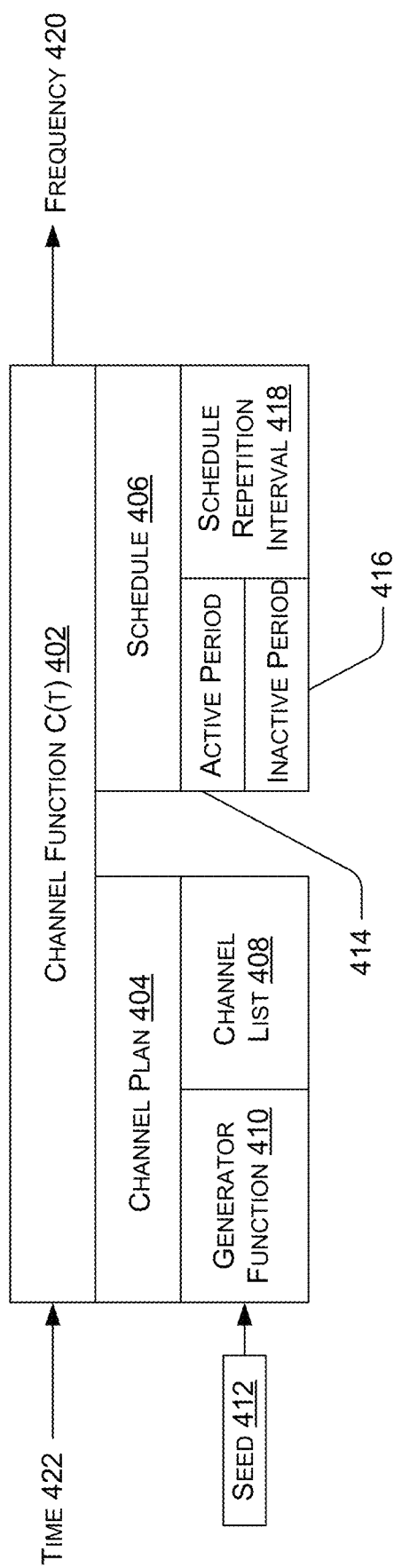
FIG. 4 is a timing diagram showing example downlink event allocation, and showing an example period of time and event offsets within that period of time.

FIG. 4 shows example techniques for downlink event offset allocation 400. In the example, a period 402 (e.g., a period of time) is configured to include a plurality of event offsets 404-414. In example use of the downlink event allocation 400, a mains-powered device (MPD) transmits over the period of time 402. Within the period of time 402, one or more of the event offsets 404-414 are associated with one or more battery-powered devices (BPDs). The event offsets 404-414 are periods of time that are "offset" from the beginning of the period 402. They indicate "events," such as communication between the MPD and one or more BPDs and/or the reasons for such communications. The BPDs are configured to listen in a periodic manner, such that each BPD turns on its radio and/or other functionality (e.g., processor, memory, etc.) as indicated by one or more event offsets associated with that BPD. In an example, a BPD may participate in a broadcast event timed according to a first event offset. The broadcast event may involve a data transmission from the MPD to a plurality of BPDs. The BPD may participate in a multicast event timed according to a second event offset. The multicast event may involve a plurality of BPDs communicating, in a receive-only or two-way manner, with the MPD. The BPD may participate in a unicast event timed according to a third offset. The unicast event may involve one-on-one, one- or two-way communication, between the MPD and the BPD.

In one example of techniques for downlink event allocation 400, the period of time 402 may be one minute long, although longer and shorter periods could be used in other examples. In the example, each event offset 404-414 could be one-half second in length. In some examples, the entire communication between the MPD and BPD(s) could be concluded within the period of time of the event offset. In other examples, the MPD may communicate with one BPD on one RF frequency at a time that starts at the event offset, but continues beyond the end of the event offset. The MPD may communicate with a second BPD on a second RF frequency at a time that starts at a different event offset, possibly overlapping somewhat in time. Accordingly, a communication may start at the beginning of an event offset but conclude either before the end of the event offset, at the end of the event offset, or after the end of the event offset.

Figure 5:
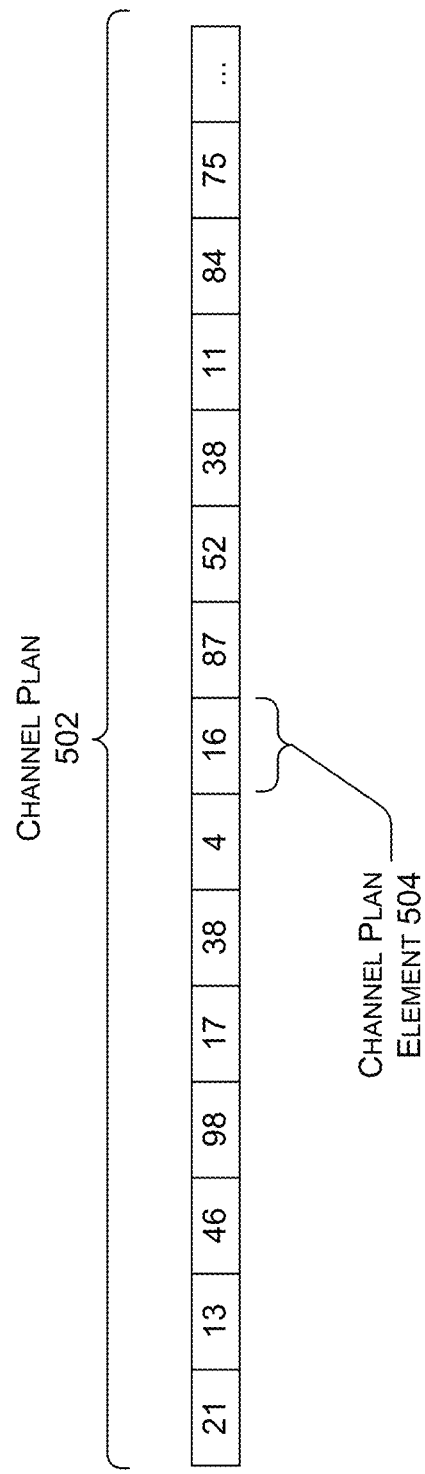
FIG. 5 is a timing diagram showing the example period of time after inclusion of additional event offsets resulting in each event offset being shortened.

FIG. 5 shows example techniques for downlink event offset allocation 500. In the example, a period 502 (e.g., a period of time) is configured to include a plurality of event offsets 504-522. The downlink event offset allocation 500 differs from the allocation 400 primarily in that it includes more event offsets. The length of the period of time 402 and may be shorter than, the same as, or longer than, the period of time 502. Similarly, the length of the event offsets 404-414 and may be shorter than, the same as, or longer than, the length of event offsets 504-522. Additionally, each of the event offsets 404-414 may be of the same duration or different durations. Similarly, each of the event offsets 504-522 may be of the same duration or different durations.

Example Methods

In some examples of the techniques discusses herein, the methods of operation and/or the functionality attributable to the "modules" may be performed by one or more application specific integrated circuits (ASICs), field programmable gate arrays (FPGAs), or other hardware devices, or may be performed by a general-purpose processor 202 utilizing software defined in computer readable media. In the examples and techniques discussed herein, the memory 212 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 6:
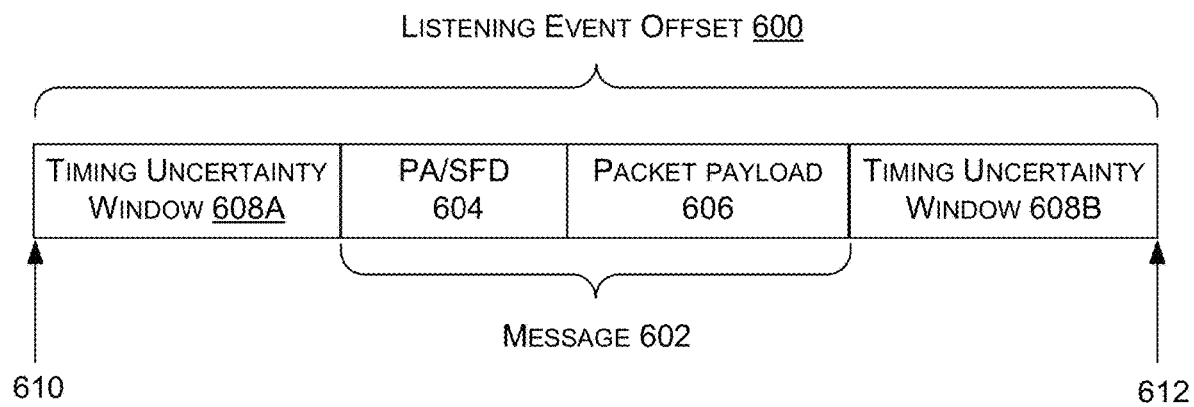
FIG. 6 schematically illustrates an example listening event offset for a BPD to listen for communications from an MPD.

FIG. 6 illustrates an example listening event offset 600 in which a BPD may listen for messages that are transmitted by other devices, such as MPDs. By listening for messages only at scheduled listening event offsets according to a repeating schedule, the BPD may minimize the amount of battery power that would otherwise be utilized in order to listen for messages at all times. The listening event offset repeating schedule is typically shared, learned and/or negotiated with other devices that may be sending messages to the BPD. This sharing, learning and/or negotiating may occur, for example, in a discovery period during which the BPD is discovering other devices that are already joined to a network, or over time via the use of beacons and/or other communications not specifically for discovery. Discovery may be, for example, via passive discovery beacons that are broadcast by the already-joined devices. As mentioned above, this listening methodology for a BPD to listen for messages from other network devices may conserve battery life as compared to methodologies in which the BPD has its receiver on for long periods. Generally, actively receiving uses less power than transmitting. Furthermore, passively listening generally uses less power than actively receiving.

Turning now specifically to FIG. 6, the listening event offset 600 is associated with an offset at which a BPD is listening for a message 602 from another device. The message 602 typically comprises a packet preamble and frame synchronization delimiter (PA/SFD) 604 and a packet payload 606. Due to an uncertainty by the BPD as to when the other device will transmit the message, the listening event offset 600 also includes a timing uncertainty window before (608A) and after (608B) the message 602. The timing uncertainty windows 608A and 608B generally accounts for a mis-synchronization of device clocks as well as accounting for a jitter in the transmission of the message 602. Jitter may include, for example, an uncertainty in a transmitter on time due to characteristics of a transmitter possibly as well an uncertainty in the clock used by the transmitter to time its transmissions.

Particularly given the listening event offset schedules of multiple BPDs, a device sending messages to those BPDs would conventionally implement a methodology to store and then transmit messages to the BPDs at the listening event offsets. The messages being transmitted to the BPDs by a device may, for example, include data of iPv6 packets received by the device, such as via an edge router of a network. In another example, the packets being transmitted to the BPDs by a device may include messages from a security module, such a security module implementing Extensible Authentication Protocol (EAP) over LAN (EAPoL), which is a network port authentication protocol used in IEEE 802.1X (Port Based Network Access Control) developed to give a generic network sign-on to access network resources.

Figure 7:
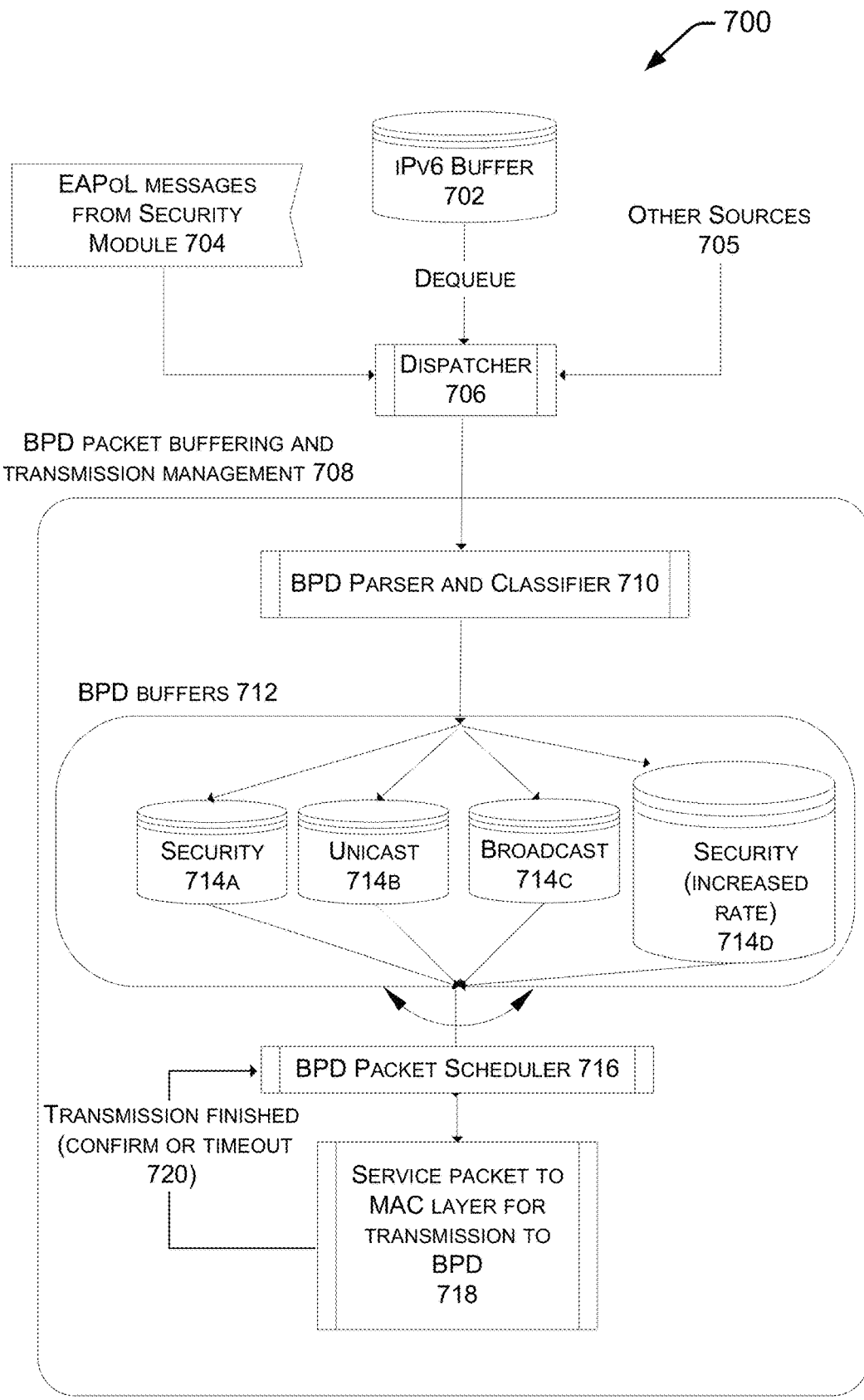
FIG. 7 illustrates an example MPD system that schedules and provides data to BPDs in accordance with the BPD listening event offsets.

FIG. 7 illustrates an example architecture of a device 700 such as a MPD that schedules and provides data to BPDs or to any devices that implement a listening event offset schedule methodology for receiving data. In accordance with the example architecture shown in FIG. 7, data may be received by the device 700 as iPv6 packets that are dequeued from an iPv6 buffer 702. As another example, EAPoL messages 704 may be received from a security module of the device 700. Reference numeral 705 indicates possible "other sources" for data to be received, whether from a source internal to the device 700 or external to the device 700. Whatever the source, a dispatcher 706 dispatches the data to a BPD packet buffering and transmit management system 708 of the device.

The BPD packet buffering and transmit management system 708 is, in the example, operating in a communication stack between the network layer and Media Access Control (MAC) layer of the networking protocol stack of the MPD. The BPD packet buffering and transmit management system 708 includes a BPD parser and classifier 710, that operates dispatch of data by the dispatcher 706, to parse and assign the data to the various listening event offsets in the repeating listening event offset schedule. In the FIG. 7 example, the parsing performed by the BPD parser and classifier 710 may include determining the mode of delivery to one or more BPDs, such as according to a particular security protocol, by unicast or by broadcast. In conjunction with determining the mode of delivery, the parsing performed by the BPD parser and classifier 710 may include inspecting the data to determine a destination BPD of the received data. Based on the parsing, the received data is classified to be stored into particular ones of BPD buffers 712, that correspond to listening event offsets.

In the FIG. 7 example, the BPD buffers 712 include buffer 714*a* for security data, buffer 714*b* for unicast data and buffer 714*c* for broadcast data. In other words, FIG. 7 shows buffers 714*a*, 714*b* and 714*c* each correspond to a respective listening event offset. For additional such listening event offsets, additional buffers like buffers 714*a*, 714*b* and 714*c* are provided for each additional listening event offset. For example, if there are ten listening event offsets according to the repeating listening event offset schedules of the BPDs, then ten times three (equals thirty) total buffers are provided from which to service the ten listening event offsets. By "servicing" a listening event offset, it is meant at least providing data (such as to a MAC layer of the device) for transmission at the listening event offset.

As shown in the FIG. 7 example, a BPD Packet Scheduler 716 operates, according to packet scheduling policies, to retrieve the appropriate data for a packet servicer 718 to provide that data to the MAC layer of the device for transmission to a BPD at a listening event offset. In one example, the BPD Packet Scheduler 716 operates according to iterations of a state machine to service a particular one of the buffer of BPD buffers 712 based on the timing and type of upcoming listening event offsets.

A feedback mechanism 720 may be provided to communicate back to the BPD Packet Scheduler 716 whether the transmission to the BPD is successful. In FIG. 7, an example feedback mechanism 720 provides an indication to the BPD Packet Scheduler 716 whether an indication of successful transmission to the BPD is received from the MAC layer or the transmission was attempted but timed out.

The number of buffers provided for each listening event offset is determined at least by the number of scheduling policies for which the BPD Packet Scheduler 716 is configured. Therefore, if the BPD Packet Scheduler 716 is reconfigured to handle an additional scheduling policy, then an additional buffer is provided for each listening event offset, to handle data serviced for the listening event offset according to the new scheduling policy. Furthermore, an additional buffer 714*d*, to hold security authentication data that must be provided to BPDs at a relatively high rate, is provided in one example to be common among all listening event offsets. The required relatively high rate may be a result, for example, of a requirement to complete an entire authentication process such as one governed by the EAPoL protocol, within a particular period of time such as four minutes total.

With the FIG. 7 example system 700, then, when listening event offsets are added at which the device may transmit data, multiple additional buffers 714 would be required for each added listening event offset. For example, if one listening event offset is added, at least three additional buffers 714*a*, 714*b* and 714*c* would be required. Furthermore, the BPD Parser and Classifier 710 need to be reconfigured to parse and classify received data for deposit into the additional buffers. Yet further, BPD Packet Scheduler 716 needs to be reconfigured to work with the additional buffers.

Figure 8:
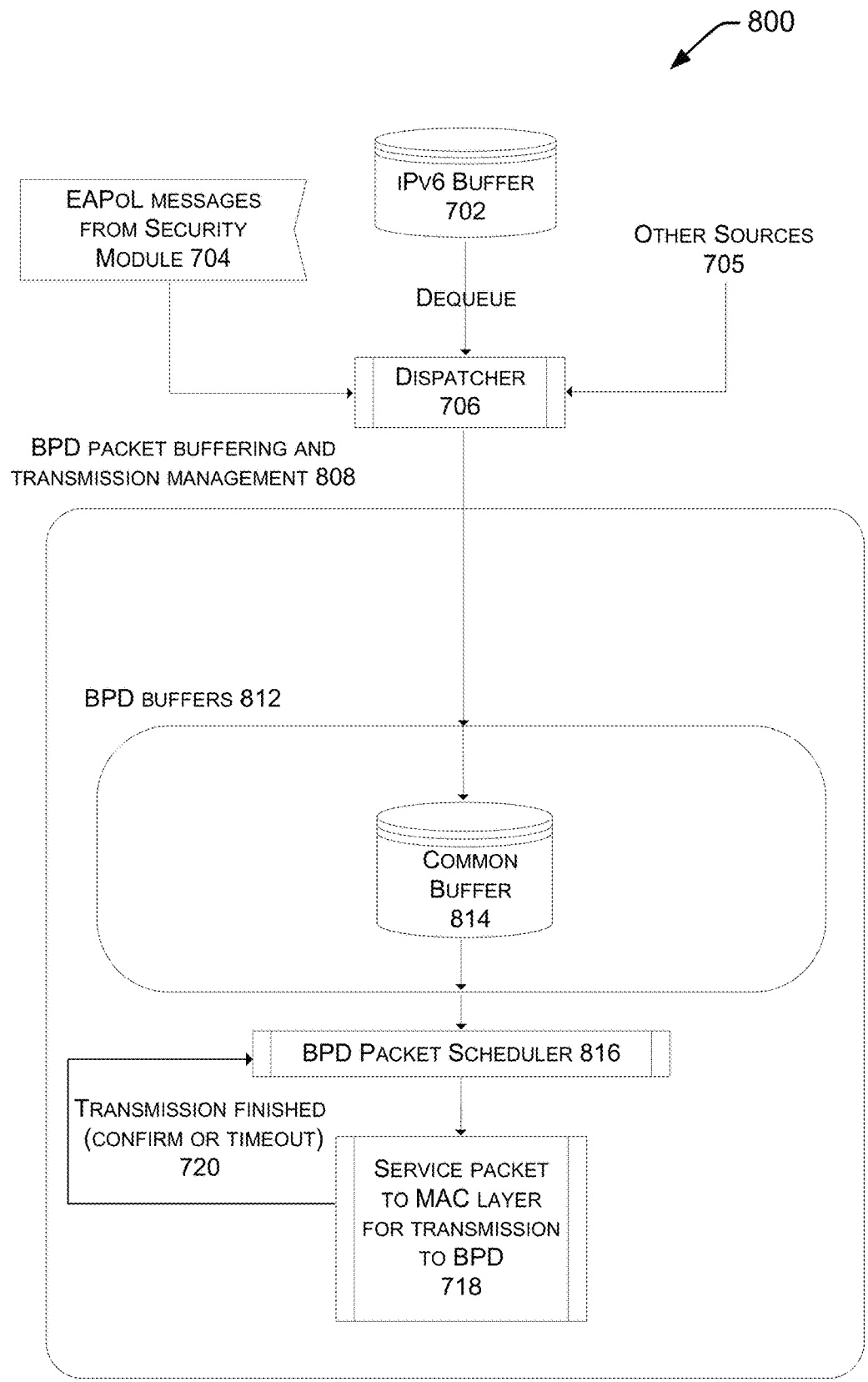
FIG. 8 schematically illustrates another example MPD system that schedules and provides data to BPDs in accordance with the BPD listening event offsets.

FIG. 8 schematically illustrates an example system 800 in which a BPD packet buffering and transmission management system 808 can be more easily configured to handle data of added listening event offsets than that of the example BPD packet buffering and transmission management system 708 illustrated in the FIG. 7 example. Where the elements of the FIG. 8 example system are the same as the elements of the FIG. 7 example system, the same reference numbers are used. Turning back to FIG. 8, data dispatched from the dispatcher 706 is deposited into a common buffer 814 without being parsed and classified. The BPD packet scheduler 816, its scheduling policy being reconfigurable to handle data for various desired and/or required listening event offsets, operates on a precise schedule that is dictated by the timing of the various listening event offsets.

More specifically, based on a predetermined time period prior to each listening event offset, the BPD packet scheduler 816 applies the scheduling policy and, based thereon, retrieves from the common buffer 714 data associated with, and thus to be transmitted at, the upcoming listening event offset. Data may be removed by the BPD packet scheduler 816 from the common buffer 714 when provided to the MAC layer for transmission, if the transmission is according to an unreliable protocol, or when acknowledged or timed out, if the transmission according to a reliable protocol. It can thus be seen that configuration of the BPD packet buffering and transmission management system 808 to handle additional listening event offsets is localized to the BPD packet scheduler 816. The need for a BPD parser and classifier 716 (FIG. 7) has been eliminated, as has the need for the multiple buffers 714. The predetermined time prior to each listening event offset may be based, for example, on the amount of preparation time required by the firmware implementing the BPD packet buffering and transmission management system 808 to retrieve the appropriate data from the common buffer 814, for the packet servicer 718 to provide the data to the MAC layer, and for the MAC layer to complete preparations to transmit the data in sufficient time to be able to transmit the data to the BPD at the beginning of the listening event offset. The amount of preparation time may be determined experimentally or heuristically, for example. Also, in some examples, the amount of time allocated to preparation time is at the resolution of the clock available to the BPD packet buffering and transmission management system 808, and that clock may be at a lower resolution than the clock available to the MAC layer itself. In one example, the clock available to the BPD packet buffering and transmission management system 808 is on the order of one second resolution and the clock available to the MAC layer is on the order of milliseconds. In another example, the clock available at the MAC layer is on the order of milliseconds, and that clock is available to the BPD packet buffering and transmission system 808, and the amount of preparation time is also on the order of milliseconds.

By performing allocation of data to a listening event offset close to the actual time of the listening event offset rather than upon receipt of the data, the allocation is more likely to match the requirements of the system at the time of transmission, since it is possible for the state of the system to change between the time of receipt of data and the time of transmission. This is even more likely if a sudden high priority data item is received.

Figure 9:
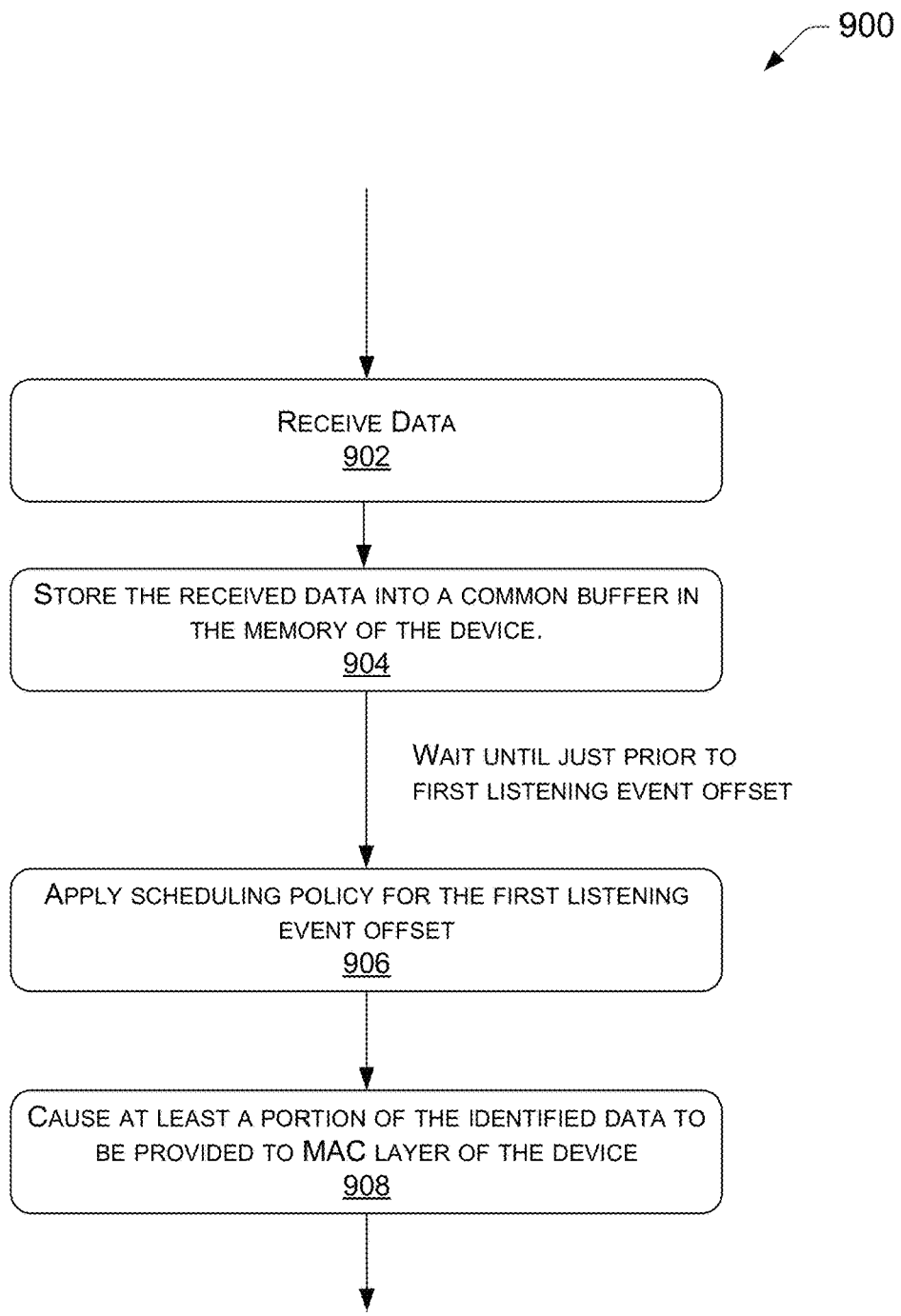
FIG. 9 is a flowchart illustrating an example process for the FIG. 8 example system, to schedule and provide data to BPDs in accordance with the BPD listening event offsets.

FIG. 9 is a flowchart illustrating an example process 900 for the FIG. 8 example system, to schedule and provide data to BPDs in accordance with the BPD listening event offsets. At 902, a device receives data. At 904, the device stores the received data into a common buffer in the memory of data for communication to the one or more other devices in the network at least one of a plurality of listening event offsets. At 906, prior to a first listening event offset, the device applies a scheduling policy for the first listening event offset to identify data in the common buffer associated with the first listening event offset. At 908, the device causes at least a portion of the identified data to be provided to a Media Access Control (MAC) layer of the device for transmission by the device at the first listening event offset.

Figure 10:
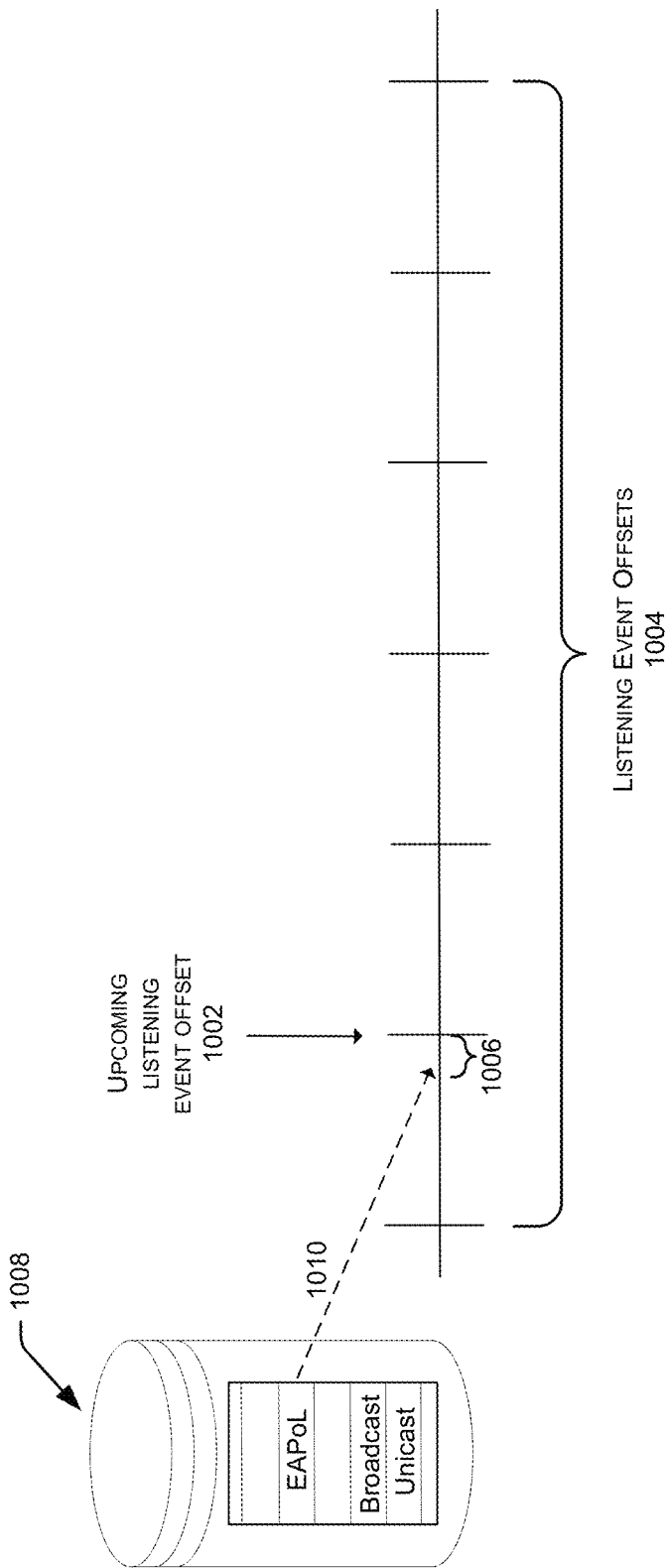
FIG. 10 is an example timeline to illustrate an example of the example process of FIG. 9 being carried out on a device.

FIG. 10 is an example timeline to illustrate an example of the process 900 being carried out on a device, for one upcoming listening event offset 1002 of a plurality of listening event offsets 1004. At least a predetermined amount of time 1006 prior to the upcoming listening event offset 1002, the scheduling policy is applied to the upcoming listening event offset 1002 to identify data in the common buffer 1008 associated with the upcoming listening event offset. In the FIG. 10 example, the identified data is related to an EAPoL authentication process being carried out at the upcoming listening event offset 1002. The EAPoL data, having been identified in the common buffer 1008, is provided 1010 to the MAC layer of the device for communication at the upcoming listening event offset 1004. Similar processing takes place at others of the listening event offsets 1002.

CONCLUSION

We have thus described devices and methods by which devices may Techniques are described in which BPD scheduling operations in a transmitting device, such as an MPD, can be more easily dynamical reconfigured to handle data of added listening event offsets. Furthermore, because data to be transmitted is identified just prior to a listening event offset, the data transmitted is responsive to a most recent state of the transmitting system.

Although the disclosure describes embodiments having specific structural features and/or methodological acts, it is to be understood that the claims are not necessarily limited to the specific features or acts described. Rather, the specific features and acts are merely illustrative some embodiments that fall within the scope of the claims of the disclosure.

What is claimed is:

1. A device for operation in a network, including communicating to one or more other devices in the network, comprising:
   one or more processors;
   memory coupled to the one or more processors, the memory storing instructions executable by the one or more processors to perform operations comprising:
   receiving data;
   storing the received data in a common buffer in the memory for communication to the one or more other devices in the network at least one of a plurality of listening event offsets, wherein the storing operation is without regard for a correlation of the received data with a particular one of the plurality of listening event offsets;
   applying a scheduling policy for a first listening event offset to correlate data in the common buffer with the first listening event offset; and
   causing at least a portion of the correlated data to be provided to a Media Access Control (MAC) layer of the device for transmission by the device at the first listening event offset.

2. The device of claim 1, the operations further comprising:
   applying the scheduling policy for a second listening event offset to correlate data in the common buffer with the second listening event offset; and
   causing at least a portion of the correlated data for the second listening event offset to be provided to the MAC layer of the device for transmission by the device at the second listening event offset.

3. The device of claim 1, wherein:
   the operation of applying the scheduling policy for the first listening event offset includes identifying data in the common buffer that is characterized by a property associated with the first listening event offset.

4. The device of claim 3, wherein:
   the property associated with the first listening event offset is an indication of a MAC-layer transmission priority associated with the first listening event offset.

5. The device of claim 3, wherein:
   the operation of applying the scheduling policy for the first listening event offset includes identifying a MAC-layer property associated with the first listening event offset; and
   the operation of identifying the data in the common buffer that is characterized by the property associated with the first listening event offset includes identifying data in the common buffer that is characterized by the MAC-layer property associated with the first listening event offset.

6. The device of claim 1, wherein:
   the operation of applying the scheduling policy for the first listening event offset is initiated at a time prior to the first listening event offset sufficient for completion of the applying operation, the operation of causing at least a portion of the identified data to be provided to the MAC layer of the device, and operations by the MAC layer to prepare for transmission at the first listening event offset.

7. The device of claim 1, wherein a clock used by the MAC layer to time operations of the MAC layer is utilized by the device to schedule the operations of applying the scheduling policy and causing at least a portion of the correlated data to be provided to the MAC layer of the device.

8. A method of operating a device in a network, comprising operations of:
   receiving data;
   storing the received data into a common buffer in a memory of the device for communication to one or more other devices in the network at least one of a plurality of listening event offsets, wherein the storing operation is without regard for a correlation of the received data with a particular one of the plurality of listening event offsets;

applying a scheduling policy for a first listening event offset to correlate data in the common buffer with the first listening event offset; and causing at least a portion of the correlated data to be provided to a Media Access Control (MAC) layer of the device for transmission by the device at the first listening event offset.

9. The method of claim 8, the operations further comprising:

applying the scheduling policy, for a second listening event offset, to correlate data in the common buffer associated with the second listening event offset, and causing at least a portion of the correlated data for the second listening event offset to be provided to the MAC layer of the device for transmission by the device at the second listening event offset.

10. The method of claim 8, wherein:

the operation of applying the scheduling policy for the first listening event offset includes identifying data in the common buffer that is characterized by a property associated with the first listening event offset.

11. The method of claim 10, wherein:

the property associated with the first listening event offset is an indication of a MAC-layer transmission priority associated with the first listening event offset.

12. The method of claim 10, wherein:

the operation of applying the scheduling policy for the first listening event offset includes identifying a MAC-layer property associated with the first listening event offset; and the operation of identifying the data in the common buffer that is characterized by a property associated with the first listening event offset includes identifying data in the common buffer that is characterized by the MAC-layer property associated with the first listening event offset.

13. The method of claim 8, wherein:

the operation of applying the scheduling policy for the first listening event offset is initiated at a time prior to the first listening event offset sufficient for completion of the applying operation, the operation of causing at least a portion of the identified data to be provided to the MAC layer of the device, and the MAC layer to prepare for transmission at the first listening event offset.

14. The method of claim 8, wherein a clock used by the MAC layer to time operations of the MAC layer is utilized by the method to schedule the operations of applying the scheduling policy and causing at least a portion of the correlated data to be provided to the MAC layer of the device.

15. One or more non-transitory computer-readable storage media storing computer-readable instructions that, when executed, instruct one or more processors of a device in a network to perform operations comprising:

receiving data;

storing the received data into a common buffer in a memory of the device for communication to one or more other devices in the network at least one of a plurality of listening event offsets, without regard for a correlation of the data with any particular one of the plurality of listening event offsets, wherein the storing operation is without regard for a correlation of the received data with a particular one of the plurality of listening event offsets;

applying a scheduling policy for a first listening event offset to identify correlate data in the common buffer with the first listening event offset; and causing at least a portion of the correlated data to be provided to a Media Access Control (MAC) layer of the device for transmission by the device at the first listening event offset.

16. The one or more non-transitory computer-readable storage media of claim 15, the operations further comprising:

performing the operation of applying the scheduling policy, for a second listening event offset to correlate data in the common buffer with the second listening event offset, and causing at least a portion of the correlated data for the second listening event offset to be provided to the MAC layer of the device for transmission by the device at the second listening event offset.

17. The one or more non-transitory computer-readable storage media of claim 15, wherein: the operation of applying the scheduling policy for the first listening event offset includes identifying data in the common buffer that is characterized by a property associated with the first listening event offset.

18. The one or more non-transitory computer-readable storage media of claim 17, wherein: the property associated with the first listening event offset is an indication of a MAC-layer transmission priority associated with the first listening event offset.

19. The one or more non-transitory computer-readable storage media of claim 15, wherein:

the operation of applying the scheduling policy for the first listening event offset is initiated at a time prior to the first listening event offset sufficient for completion of the applying operation, the operation of causing at least a portion of the correlated data to be provided to the MAC layer of the device, and operations by the MAC layer to prepare for transmission at the first listening event offset.

20. The one or more non-transitory computer-readable storage media of claim 15, wherein a clock used by the MAC layer to time operations of the MAC layer is utilized to schedule the operations of applying the scheduling policy and causing at least a portion of the correlated data to be provided to the MAC layer of the device.

* * * * *